United States Patent [19]

Lee et al.

[11] Patent Number: 4,850,775
[45] Date of Patent: Jul. 25, 1989

[54] SCREW-TYPE FASTENING DEVICE

[76] Inventors: Jae B. Lee; Kum C. Choe, both of 120 W. 228 St. #J, Bronx, N.Y. 10463

[21] Appl. No.: 186,389

[22] Filed: Apr. 26, 1988

[51] Int. Cl.⁴ .......................................... F16B 35/04
[52] U.S. Cl. .................................... 411/366; 411/411; 411/938
[58] Field of Search ............... 411/366, 411, 414, 416, 411/308–311, 938, 324, 947; 285/333, 390

[56] References Cited

U.S. PATENT DOCUMENTS

| | | |
|---|---|---|
| 1,075,310 | 10/1913 | Ulrich ............................ 411/309 |
| 2,091,788 | 8/1937 | McManus ...................... 411/308 |
| 2,215,770 | 9/1940 | Sheffield . |
| 2,543,100 | 2/1951 | Engh . |
| 3,258,284 | 6/1966 | Phipps ........................... 411/411 |
| 3,394,626 | 7/1968 | Oliver ............................ 411/411 |
| 3,487,442 | 12/1969 | Rossmann . |
| 3,520,343 | 7/1970 | Evans ............................. 411/311 |
| 3,661,194 | 5/1972 | Macfarlane et al. ............ 411/311 |
| 3,664,540 | 5/1972 | Witkin . |
| 4,023,914 | 5/1977 | Holmes . |
| 4,171,012 | 10/1979 | Holmes . |
| 4,341,497 | 7/1982 | Downey et al. ................ 411/311 |
| 4,549,754 | 10/1985 | Saunders et al. . |
| 4,600,224 | 7/1986 | Blose . |
| 4,600,225 | 7/1986 | Blose . |

FOREIGN PATENT DOCUMENTS

| | | | |
|---|---|---|---|
| 673255 | 10/1964 | Italy .............................. 411/411 |
| 371359 | 8/1973 | U.S.S.R. ........................ 411/411 |
| 106318 | 5/1917 | United Kingdom ........... 411/411 |
| 2104997 | 3/1983 | United Kingdom ........... 411/411 |

Primary Examiner—Neill R. Wilson
Attorney, Agent, or Firm—Birch, Stewart, Kolasch & Birch

[57] ABSTRACT

A screw-type fastening device including a male threaded element such as a bolt and a female threaded element such as a nut in which each element contains continuous helical root and crest disposed therein wherein the root and crest include cone-shaped crests and cone-shaped roots at an angle of about 45° to 90°, respectively, external and internal chevron-shaped slots at angles of about 135° to 225°, respectively, and three pairs of parallel load flanks, respectively, for easily releasing the threaded elements without abrasion and protecting them from self-loosening from each other.

6 Claims, 1 Drawing Sheet

SCREW-TYPE FASTENING DEVICE

BACKGROUND OF THE INVENTION

1. Field of the Invention

The present invention relates to a screw-type fastening device such as a bolt and nut, a bolt, casting screws, and the like and, more particularly, to a combined male and female threaded elements assembly which is shaped to swage crests of mating internal threads and thereby provides an interference fit and prevailing torque that resists self-loosening and protects the internal threads from abrading when the fastened male and female threaded elements are separated from each other.

2. Description of the Prior Art

Many fastening devices such as a bolt and nut known in the art include many types of continuous helical external and internal threads, such as for example, triangular or rectangular thread configurations. Such fastening devices are shown in U.S. Pat. Nos. 2,091,788 to McManus 2,543,100 to Engh, 3,520,345 to Evans, 4,171,012 to Holmes, 4,549,754 to Saunders et al, and 4,600,225 to Blose. However, there are many problems with the prior art fastening devices. For example, it is difficult to tightly fasten them and it is easy to loosen them after fastening when the apparatus using such fastening devices is subjected to continuous vibrations, movements and/or impacts because the male and female threaded elements are shaped with different configurations. Also such fastening devices cannot prevent abrasion of the threaded portions when the fastened male and female elements are separated from each other.

SUMMARY OF THE INVENTION

Accordingly, it is an object of the present invention to provide a newly improved screw-type fastening device.

Another object of the present invention is to provide a screw-type fastening device which includes cone-shaped helical crests and roots having a horizontal surface about an axis of male and female threaded elements, respectively, so that the male and female threaded elements can be tightly fastened and do not loosen from each other.

A further object of the present invention is to provide a screw-type fastening device in which the male and female threaded elements include the same configured helical threads so that each threaded element, such as a bolt and a nut or a bolt and a screw casting, is protected from abrasion of the surface of the threads thereof upon operation of the device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is related to a screw-type fastening device which comprises a male threaded element such as a bolt and a female threaded element such as a nut in which each element contains continuous helical external and internal threads disposed therein. The external and internal threads compose cone-shaped crests and cone-shaped roots at an angle of about 45° to 90°, respectively, external and internal chevron-shaped slots at angles of about 135° to 157.5°, respectively, and three pairs of parallel load flanks, respectively, for releasing without abrasion and preventing self-loosening.

DESCRIPTION OF THE PREFERRED EMBODIMENTS

Figure 1:
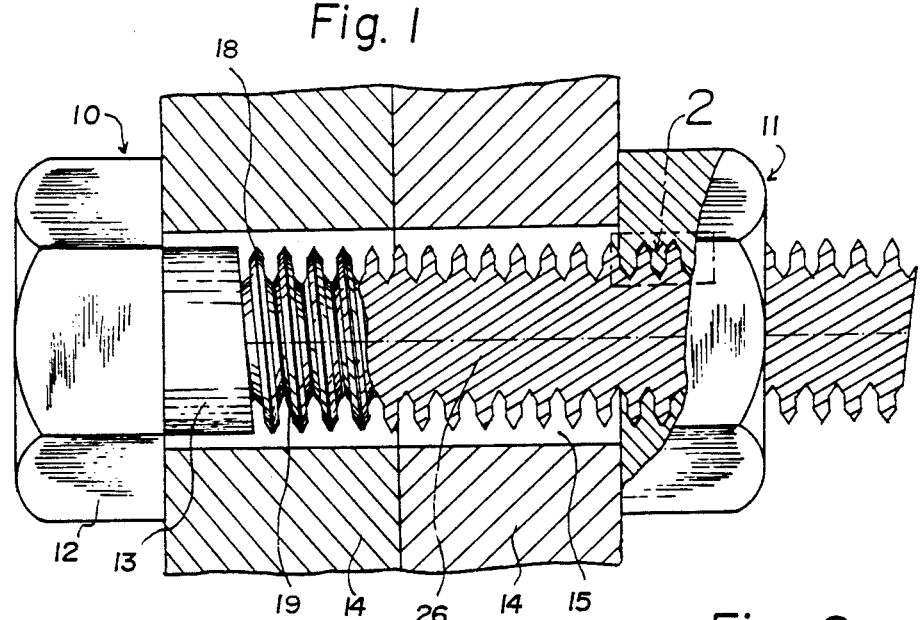
Figure 2:
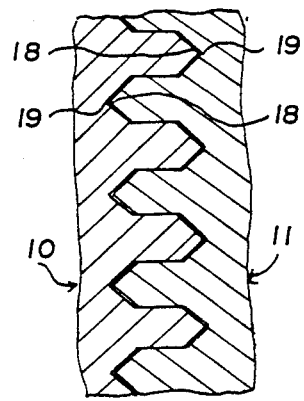

Referring now in detail to the drawings for the purpose of illustrating preferred embodiments of the present invention, the screw-type fastening device as shown in FIGS. 1 and 2 comprises a male threaded element such as a bolt 10 and a female threaded element such as a nut 11 adapted to receive the male threaded element 10 for forming a joint. The bolt 10 includes a bolt head 12, a shank 13, a continuous helical root 18, and a continuous helical internal thread 17. The nut 11 includes the continuous helical external thread 16 and a continuous helical crest 19.

Figure 3:
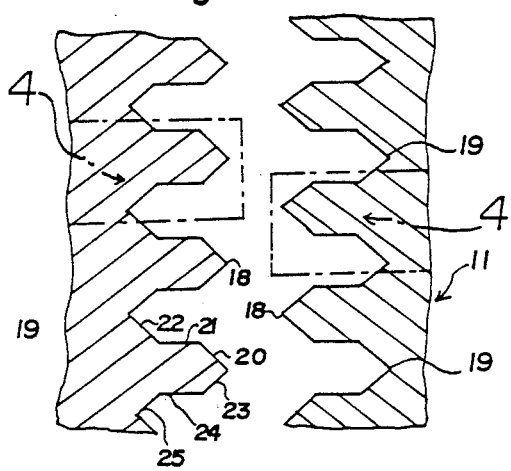
Figure 4:
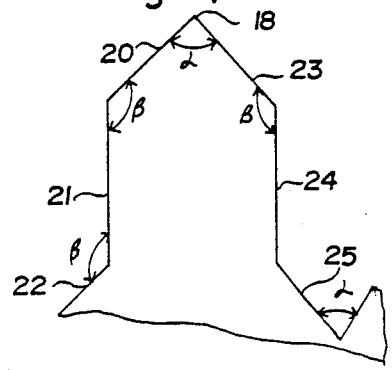
Figure 5:
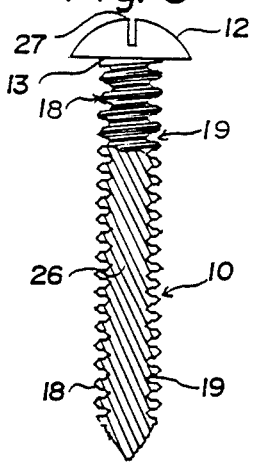

As shown FIGS. 2, 3, and 4, thus, the bolt 10 includes the continuous helical root 18 and root 19 having an angle $\alpha$ of about 45° to 90°, respectively. One surface disposed between the crest 18 and root 19 includes three load flanks 20, 21, and 22. The load flanks 20 and 22 are a oblique surface and the load flank 21 is a horizontal surface about an axis 26 of the bolt 10. Angles $\beta$ formed between the load flanks 20 and 21, and between the flanks 21 and 22 are about 135° to 157.5°, respectively. The other surface disposed between the crest 18 and root 19 includes three load flanks 23, 24, and 25. The load flanks 23 and 25 are parallel surfaces and the load flank 24 and 21 are parallel surfaces about the axis 26 of the bolt. Also angles $\beta$ formed between the load flanks 23 and 24, and between the load flanks 24 and 25 are about 135° to 157.5°, respectively. The bolt head 12 is provided with at least one pocket 27 for mating with the conventional corresponding screwdrivers (FIG. 5). The nut 11 is provided with the same elements 18–25 having the same angles $\alpha-\beta$ as on the bolt 10 for effectively mating with the bolt 10.

In operation, after the bolt 10 having the continuous helical root 18 and crest 19 extends through aligned apertures 15 in plates 14, the nut 11 having the continuous helical root 18 and crest 19 is screwed to the bolt 10 for clamping the plates 14 together. At this time, the horizontal load flanks 20 and 22 with the smooth slant load flanks 21 about the axis 26 of the nut 11 can be effectively mated with the horizontal load flanks 20 and 22 with the smooth slant load flanks 21 about the axis 26 of the bolt 10 so that the nut 11 is smoothly screwed to the bolt 10.

Furthermore, the parallel oblique load flanks 20 and 22, and 23 and 25 of the nut 11, which are directed to the bolt head 12 of the bolt 10 are slidably accelerated to screw into the bolt 10. However, after the nut 10 is fastened into the bolt, the angles $\beta$ of about 135° to 157.5° formed between the load flanks 20 and 22, and 23 and 24 of the nut 11 are completely fixed into the angles $\beta$ of about 135° to 157.5° formed between the load flanks 20 and 22, and 23 and 24 of the bolt 10 for preventing the nut 11 from loosening from the bolt 10. Furthermore, the crests 18 of the nut 11 are tightly engaged into the roots 19 of the bolts for effectively accelerating the joining of these together. Thus the nut 11 cannot loosen itself when the nut is subjected to the vibrations, movements and/or impacts of an apparatus including the nut since it utilizes the screw-type fastening device of the present invention having the load flank angles β of about 135° to 157.5°. Also, upon releasing the nut 11 from the bolt, using the conventional tools, the nut 11 can be easily released from the bolt 10 since the angles β are over 90° and the friction force of the tool can release the nut 11 from the bolt 10.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A screw-type fastening device comprising:

male and female threaded elements each having a continuous helical root and a continuous helical crest, respectively, said continuous helical root and crest including:

a plurality of alternating crests and roots formed about an axis of said male and female threaded elements, wherein said crests and roots are provided with, a first surface formed between each of said crests and roots, said first surface having first and third oblique load flanks oblique to said axis and a second horizontal load flank perpendicular to said axis and disposed thereinbetween so that said second perpendicular load flank forms angles of about 202.5° to 225° to about 135° to 157.5° with said first and third oblique load flanks, respectively, a second surface formed between said crests and roots having fourth and sixth oblique load flanks formed oblique to said axis and parallel to each other and a fifth horizontal load flank perpendicular to said axis and disposed thereinbetween so that said fifth horizontal load flank forms angles of about 202.5° to 225° and about 135° to 157.5° with said fourth and sixth horizontal load flanks, respectively, and so that said fifth horizontal load flank is parallel to said second horizontal load flank, and wherein the angle formed between said first surface and said second surface is about 45° to 90°, whereby the male threaded element is effectively fastened into the female threaded element, is easily released from the female threaded element without abrasion thereof, and prevents against loosening from the female threaded element due to vibration.

2. The screw-type device of claim 1, wherein the male threaded element is a bolt provided with a bolt head.

3. The screw-type device of claim 1, wherein the female threaded element is a nut.

4. The screw-type device of claim 1, wherein the male threaded element is a screw.

5. The screw-type device of claim 1, wherein the female threaded element is a casting screw.

6. The screw-type device of claim 2, wherein the male threaded element is provided with a pocket disposed in said bolt head thereof for receiving a tool.

* * * * *